United States Patent
Jimenez Gonzalez (10) Patent No.: US 12,463,411 B2
(45) Date of Patent: Nov. 4, 2025

(54) HYBRID MINIATURE CIRCUIT BREAKER

(71) Applicant: EATON INTELLIGENT POWER LIMITED, Dublin (IE)

(72) Inventor: Sandy Omar Jimenez Gonzalez, Coraopolis, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 225 days.

(21) Appl. No.: 18/130,465

(22) Filed: Apr. 4, 2023

(65) Prior Publication Data

US 2023/0344212 A1     Oct. 26, 2023

Related U.S. Application Data

(60) Provisional application No. 63/333,775, filed on Apr. 22, 2022.

(51) Int. Cl.
| | |
|---|---|
| *H02H 3/00* | (2006.01) |
| *H01H 89/00* | (2006.01) |
| *H02H 1/00* | (2006.01) |

(52) U.S. Cl.
CPC ............ *H02H 3/00* (2013.01); *H01H 89/00* (2013.01); *H02H 1/0007* (2013.01)

(58) Field of Classification Search
None
See application file for complete search history.

(56) References Cited

U.S. PATENT DOCUMENTS

| | | | |
|---|---|---|---|
| 9,947,496 B2 | 4/2018 | Niehoff | |
| 11,170,964 B2 | 11/2021 | Telefus et al. | |
| 11,901,140 B2 * | 2/2024 | Carlson | H01H 73/045 |
| 2016/0203932 A1 * | 7/2016 | Niehoff | H01H 47/223 |
| | | | 361/170 |
| 2020/0365345 A1 * | 11/2020 | Telefus | H01H 9/548 |
| 2022/0328273 A1 * | 10/2022 | Vaghasiya | H02J 13/00004 |

OTHER PUBLICATIONS

European Patent Office, "extended European search report" for corresponding European Application No. 23167280.9, dated Nov. 16, 2023, 7 pp.

* cited by examiner

*Primary Examiner* — Stephen W Jackson
(74) *Attorney, Agent, or Firm* — Eckert Seamans Cherin & Mellott, LLC (57) ABSTRACT

A hybrid circuit breaker includes a primary trip/isolation relay component and a primary trip/isolation relay component driver coupled to the primary trip/isolation relay component and structured to interrupt current from flowing to the load in an event of fault; a sensing mechanism structured to sense at least current, voltage, and power flowing to the load; a metrology component coupled to the sensing mechanism and structured to monitor and measure at least the current, voltage and power; a controller structured to detect the event of fault based on data received from the sensing mechanism and the metrology component and communicate with a user device; and a hybrid secondary switching device coupled to the controller and the primary trip/isolation relay component, the hybrid secondary switch device including secondary contacts, a miniaturized electromechanical relay and a power electronics circuit connected in parallel with the miniaturized electromechanical relay.

18 Claims, 8 Drawing Sheets

HYBRID MINIATURE CIRCUIT BREAKER

CROSS-REFERENCE TO RELATED APPLICATION

This patent application claims the priority benefit under 35 U.S.C. § 119(e) of U.S. Provisional Application No. 63/333,775, filed on Apr. 22, 2022, the contents of which are herein incorporated by reference.

FIELD OF THE INVENTION

The disclosed concept relates generally to circuit breakers, and in particular, to a hybrid miniature circuit breaker that provides circuit protection, load control and energy management in a power distribution system.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Traditionally, circuit breakers have utilized purely electromechanical trip components (e.g., solenoids, plungers, relays, etc.) to open the secondary contacts and provide protection against overload or short circuit conditions. However, these electromechanical components are large in size in order to ensure that the circuit breakers are capable of handling short circuit events and other faulty conditions based on the components' brute force, resulting in waste of circuit breaker space and slowness in response time.

Further, circuit breakers are increasingly being used for energy management systems, such as home energy management systems (HEMS). However, the energy management systems are built using multiple components and integration of components of the circuit breakers and the energy management systems is physically and digitally complicated, which increases the installation, commissioning, size, and cost.

There is room for improvement in circuit breakers.

There is room for improvement in energy management systems.

SUMMARY OF THE INVENTION

An example embodiment of the disclosed concept provides a hybrid circuit breaker. The hybrid circuit breaker includes a primary circuit protection device and a primary circuit protection device driver coupled to the primary circuit protection device and structured to interrupt current from flowing to the load in an event of fault; a sensing mechanism structured to sense at least current, voltage, and power flowing to the load; a metrology component coupled to the sensing mechanism and structured to monitor and measure at least the current, voltage and power; a controller coupled to the primary trip/isolation relay component driver, the sensing mechanism, and the metrology component, and structured to detect the event of fault based on data received from the sensing mechanism and the metrology component and communicate with a user device about at least the detected event of fault or the data; and a hybrid secondary switching device coupled to the controller and the primary trip/isolation relay component, the hybrid secondary switch device including secondary contacts, a hybrid relay circuit driver, and a hybrid relay circuit including a miniaturized electromechanical relay and a power electronics circuit connected in parallel with the miniaturized electromechanical relay.

Another example embodiment provides a method of energy monitoring in a power distribution system. The method includes providing a hybrid circuit breaker that comprises (i) a primary trip/isolation relay component and a primary trip/isolation relay component driver coupled to the primary trip/isolation relay component and structured to interrupt current from flowing a source to a load coupled to the hybrid circuit breaker in an event of fault, (ii) a sensing mechanism structured to sense current, voltage, and power flowing to the load, (iii) a metrology component coupled to the sensing mechanism and structured to monitor and measure at least the current, voltage and power, (iv) a controller coupled to the primary trip/isolation relay component driver, the sensing mechanism, and the metrology component, and structured to detect the event of fault based on data received from the sensing mechanism and the metrology component and communicate with a user device about at least one of the detected event of fault or the data; and (v) a hybrid secondary switching device coupled to the controller and the primary trip/isolation relay component, the hybrid secondary switch device including secondary contacts, a hybrid relay circuit driver, and a hybrid relay circuit including a miniaturized electromechanical relay and a power electronics circuit connected in parallel with the miniaturized electromechanical relay. The method further includes performing circuit protection; providing load control; and providing energy management.

Yet another example embodiment provides a method of energy monitoring using a hybrid circuit breaker including a miniaturized electromechanical relay in parallel to a power electronics circuit. The method includes detecting an event of fault within the hybrid circuit breaker; transmitting an alert including the event of fault to a user device; receiving a user command from the user device; turning OFF the miniaturized electromechanical relay and turning ON the power electronics based on the user command; deviating fault current from the miniaturized electromechanical relay to the power electronics circuit; channeling the fault current to load side via the power electronics circuit; and turning OFF the power electronics circuit upon completion of the turning OFF the miniaturized electromechanical relay.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Directional phrases used herein, such as, for example, left, right, front, back, top, bottom and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As employed herein, the statement that two or more parts are "coupled" together shall mean that the parts are joined or operate together either directly or indirectly, i.e., through one or more intermediate parts or components, so long as a link occurs.

Figure 1:
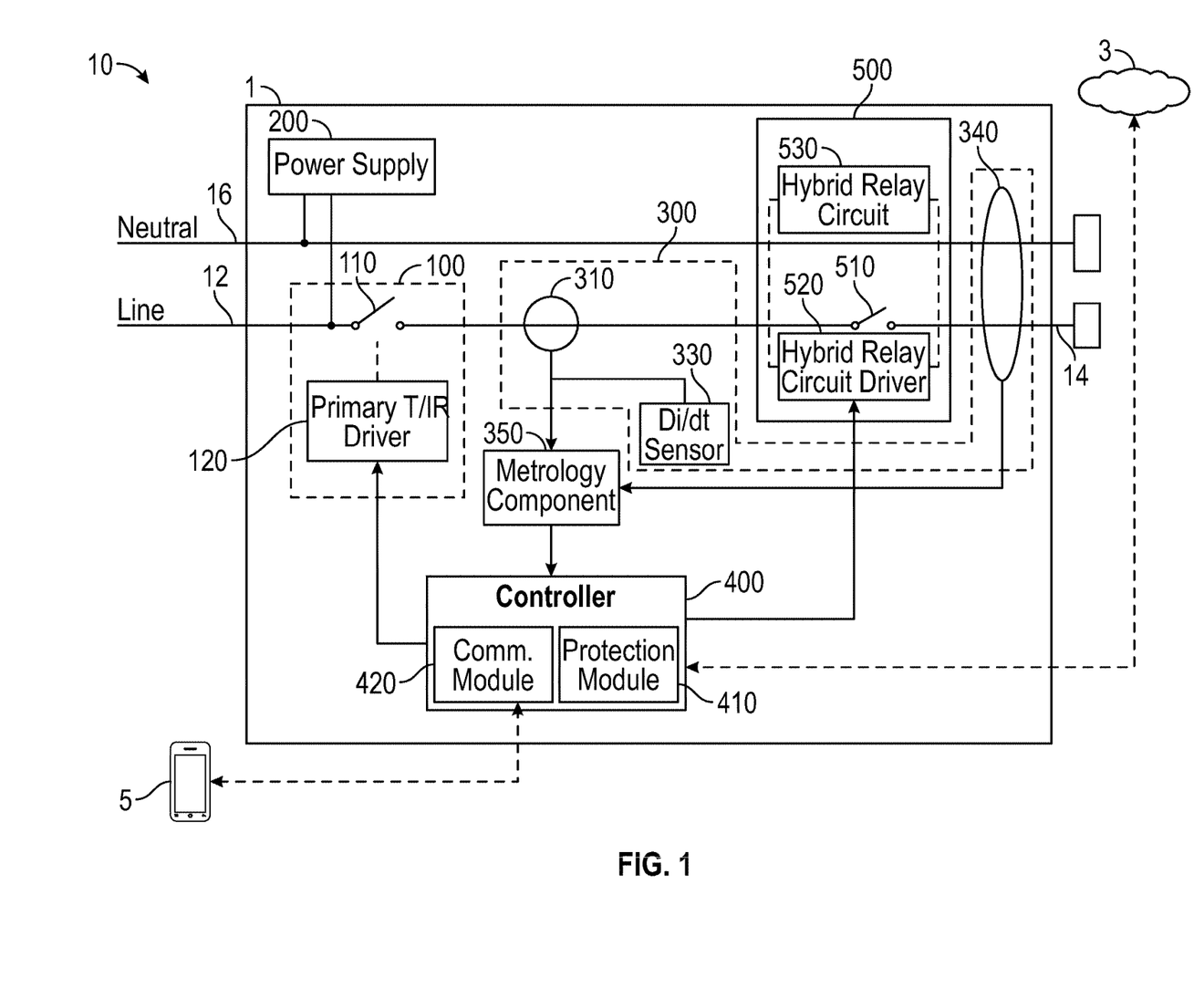
FIG. 1 is a block diagram of an exemplary energy management system in accordance with a non-limiting embodiment of the disclosed concept.

FIG. 1 is a block diagram for an exemplary energy management system 10 in accordance with a non-limiting embodiment of the disclosed concept. The system 10 includes a hybrid circuit breaker 1, a cloud 3 and a user device 5. The hybrid circuit breaker 1 may be a single-pole or multi-pole circuit breaker. The hybrid circuit breaker 1 is coupled to a HOT (LINE/IN) conductor 12, a LOAD (OUT) conductor 14, and a NEUTRAL conductor 16. The HOT conductor 12 may be electrically connected to a power source (not shown) such as a 120 Vac residential power or another suitable power source. The LOAD conductor 14 may be electrically connected to a load, e.g., a light, a refrigerator, A/C, etc. The hybrid circuit breaker 1 is structured to trip open or switch open to interrupt current flowing to the load in the case of a fault (e.g., a short circuit fault, a parallel arc fault, a permanent ground fault, etc.) or overload condition to protect the load and/or conserve energy. The hybrid circuit breaker 1 is also structured to be communicatively coupled to the cloud 3 or external local device (e.g., without limitation, a router, an electrical controller, a gateway, a node) for updating software or storing energy data in the cloud 3. The hybrid circuit breaker 1 is also structured to be communicatively coupled to a user device 5, e.g., a cellular phone, laptop or desk top computer, for circuit protection, load control, and energy management in a wireless or wired connection by turning ON/OFF secondary contacts 510 of the hybrid circuit breaker 1 remotely.

Figure 2:
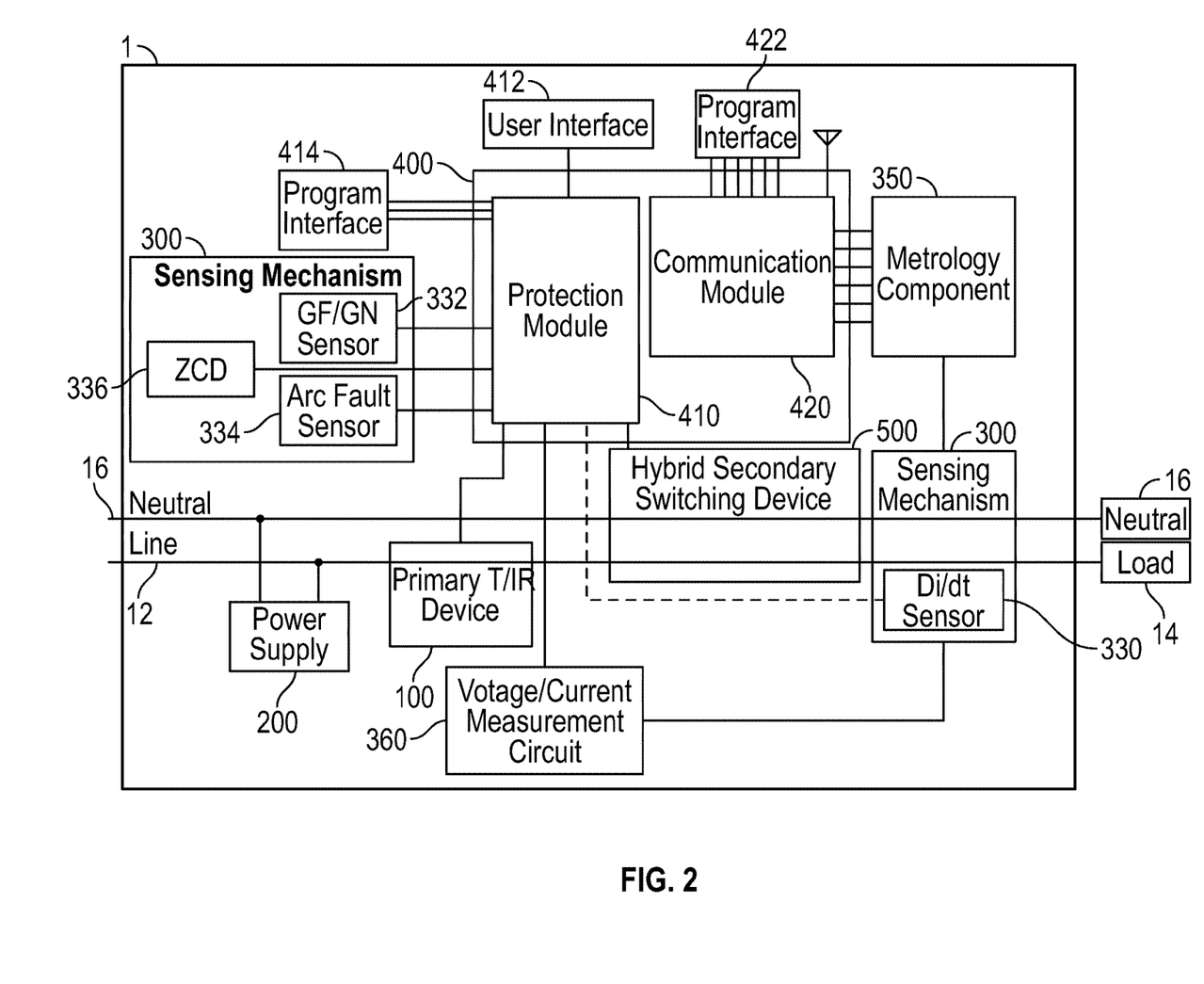
FIG. 2 is a block diagram for an exemplary hybrid circuit breaker in accordance with a non-limiting embodiment of the disclosed concept.

The hybrid circuit breaker 1 is illustrated in FIGS. 1 and 2 in accordance with a non-limiting embodiment of the disclosed concept. The hybrid circuit breaker 1 includes a primary circuit protection device 100, a power supply 200, a sensing mechanism 300, a metrology component 350, a controller 400, and a hybrid secondary switching device 500. The primary circuit protection device 100 includes a primary trip/isolation relay component 110 and a primary circuit protection device driver 120. The primary trip/isolation relay component 110 can be, e.g., without limitation, a traditional circuit breaker electromechanical mechanism (e.g., without limitation, primary contacts, solenoid, contactor, etc.) or an isolation relay. The primary circuit protection device driver 120 can be, e.g., without limitation, an operating mechanism, a solenoid driver, etc. structured to open the primary trip/isolation relay component 110 to interrupt current flowing from the power source to the load based on a signal from the controller 400. The power supply 200 supplies DC power to components of the hybrid circuit breaker 1. The power supply 200 may include a power supply for supplying low voltage (e.g., without limitation, 3.3V) to electronic components of the hybrid circuit breaker 1 and a separate insulated power supply specifically providing power for the hybrid secondary switching device 500. The sensing mechanism 300 may include a Rogowski coil 310, a di/dt sensor 330 coupled to the Rogowski coil 310, and a current transformer 340. The sensing mechanism 300 may also include an arc fault sensor 334, ground fault sensor 332, zero crossing detection circuit 336, or any other sensors as appropriate.

The metrology component 350 is coupled to the sensing mechanism 300 and the controller 400. It is structured to monitor voltage and current from amplifying hardware, calculate RMS voltage, RMS current, power, energy, etc. supplied to the load, and provide the calculated data to the communication module 420 of the controller 400. The hybrid circuit breaker 1 may also include a voltage and current measurement circuit 360 that is coupled to the sensing mechanism 300 and structured to monitor presence of voltage on the load side and provide voltage and current data directly for arc fault or ground fault detection to the protection module 410.

The controller 400 may include a protection module 410 and a communication module 420. Both control modules 410,420 may be, e.g., without limitation, a microcontroller. The protection module 410 is a main controller and configured to provide circuit protection against e.g., without limitation, short circuit, inrush current and overcurrent conditions as per UL standard and monitor protection dedicated circuits hardware such as the primary trip/isolation relay component driver 120 and the hybrid secondary switching device 500. It also receives signals from the sensing mechanism 300 and controls OPEN/CLOSE commands for the hybrid circuit breaker 1. The protection module 410 is updatable via the cloud 3. The communication module 420 is configured to provide WiFi or BLE (Bluetooth® low energy) networking and CIP (critical infrastructure protection) load identification algorithms. It is also configured to transmit metrology data to the cloud 3 for storage, and RTC (ready to close) indication to the user device 5, to route open/close commands, etc. The communication module 420 may be also updatable through a wireless or wired interface for, e.g., without limitation, WiFi or Bluetooth® low energy technologies. Both the protection module 410 and the communication module 420 are coupled to programming interface 414,422 structured for programming and debugging the modules 410,420, and programmable over the air (OTA) via an OTA antenna. The protection module 410 is coupled to a user interface 412 including a test button and/or LED indicators for feedback of the status of the hybrid circuit breaker 1. The protection module 410 is coupled to the communication module 420, which is communicatively coupled to the user device 5 for remote control of the hybrid secondary switching device 500 or the cloud 3 for updates and storage of energy data. When a user wishes to perform load control remotely via the user device 5, the user transmits a user command to open or close the secondary contacts

510 to the communication modules 420 via an OTA (over the air) antenna. The communication module 420 transmits the user command to the protection module 410, which in turn determines whether it is safe to open the secondary contacts 410. For example, the protection module 410 determines that it is safe to control the hybrid secondary switching device 500 and open the secondary contacts 510 if it determines that the primary trip/isolation relay component 110 is closed. In some examples, the protection module 410 may cause the hybrid secondary switching device 500 to open the secondary contacts 510 if the primary circuit protection device 100 is nonresponsive. In some examples, the protection module 410 may cause the primary trip/isolation relay component to open if it determines that an additional level of protection (e.g., without limitation, galvanic isolation) is required.

The hybrid secondary switching device 500 includes the secondary contacts 510, a hybrid relay circuit driver 520, and a hybrid relay circuit 530. The hybrid circuit breaker 1 is "hybrid" in that the hybrid secondary switching device 500 includes the hybrid relay circuit 530, which includes a miniaturized electromechanical relay (MEMR) 531 in parallel to a power electronics circuit 532 as shown in FIGS. 5A-6D. The miniaturized electromechanical relay 531 can be, e.g., without limitation, micro-electromechanical devices, a rotary relay, an ultrafast electromechanical relay, vacuum, air, or high dielectric gas filled relay, etc. The power electronics circuit 532 may be a semiconductor device, e.g., one or more solid-state devices including, e.g., without limitation, insulated-gate bipolar transistors (IGBTs), metal-oxide-semiconductor field-effect transistors (MOSFETs), or metal oxide varistors (MOVs).

Figure 3:
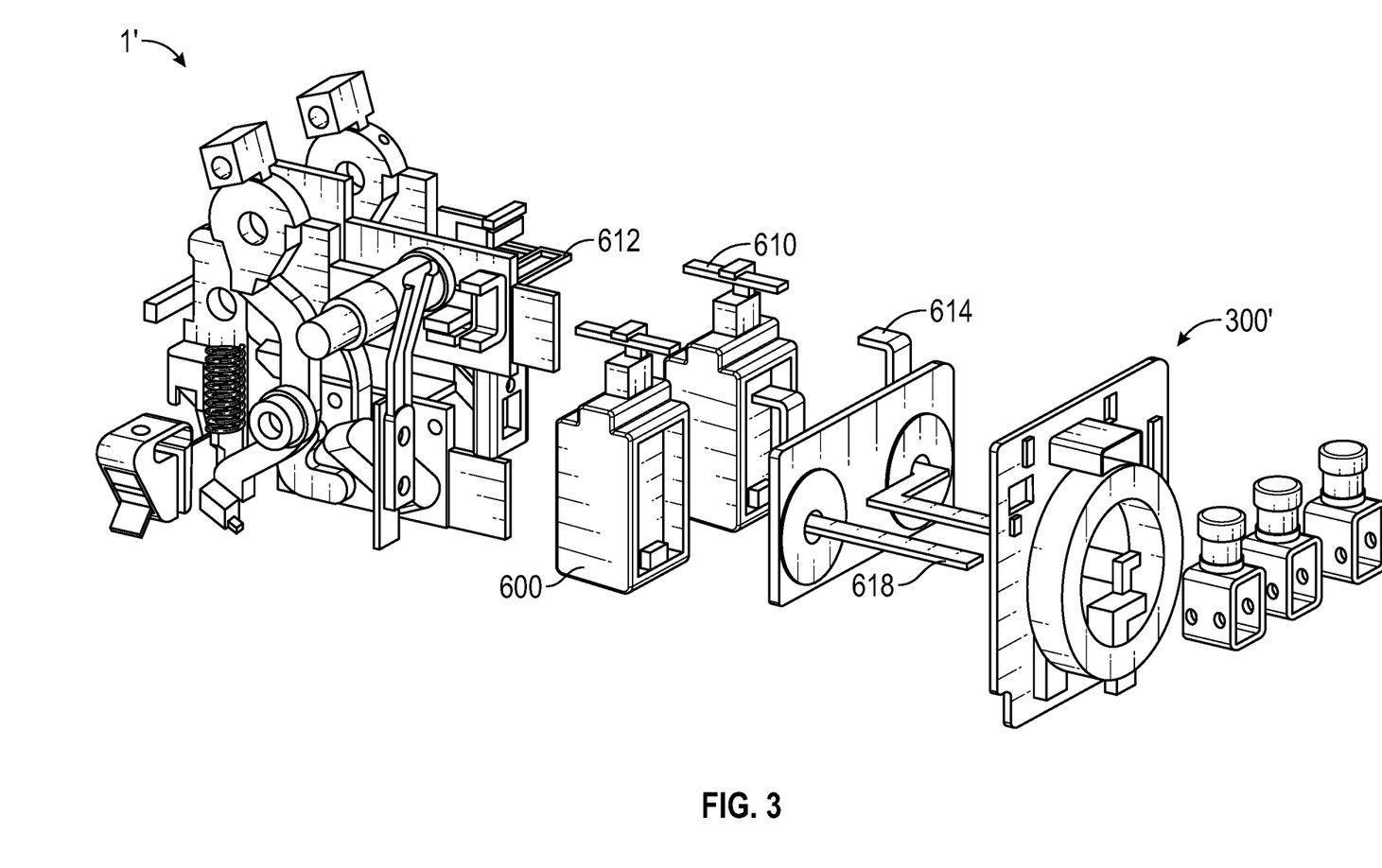
FIG. 3 illustrates an example remote controlled circuit breaker in accordance with a non-limiting embodiment of the disclosed concept.
Figure 4:
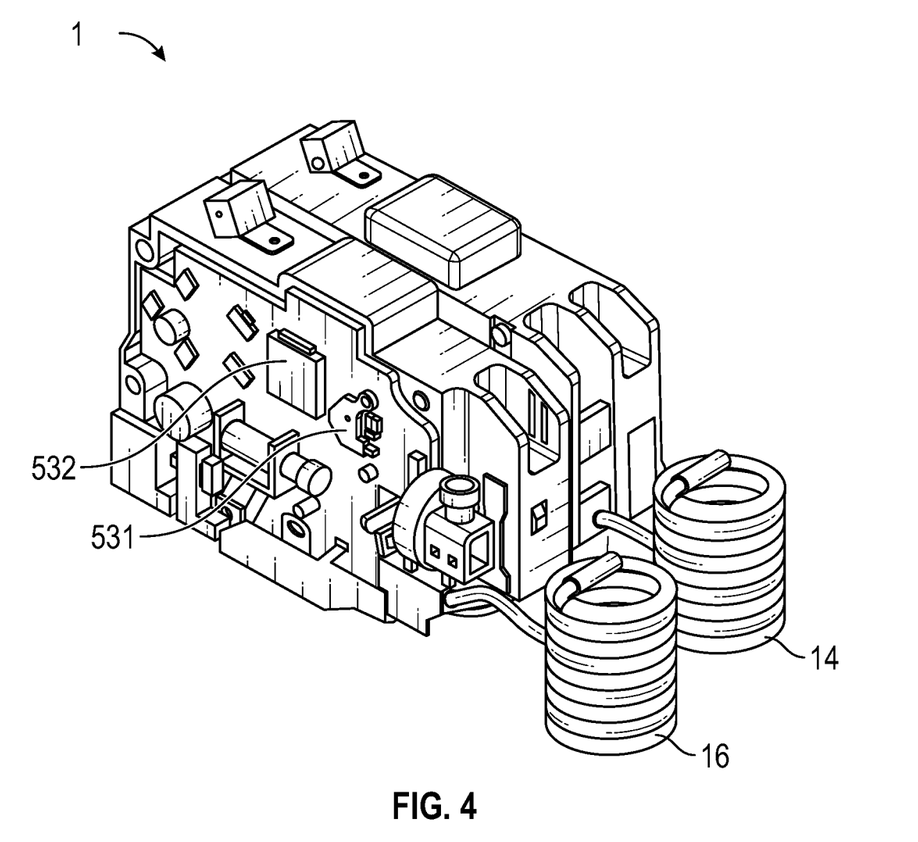
FIG. 4 illustrates an exemplary hybrid circuit breaker in accordance with non-limiting embodiment of the disclosed concept.

The miniaturized electromechanical relay 531 is small in size, e.g., without limitation, at least 500 times smaller than the traditional actuation mechanism (e.g., the solenoid 600 of FIG. 3). FIG. 3 illustrates a 2-pole remote controlled circuit breaker 1' that opens and closes the secondary contacts 612,614 by moving the solenoid 600 (e.g., a plunger of the solenoid). A sensing mechanism 300' is installed over load terminal bars 618. As the solenoid 600 moves down based on the output of the sensing mechanism 300', the crossbar 610 attached to the solenoid 600 touches the secondary stationary contact 614, thereby closing the secondary contacts 612,614. As the solenoid 600 moves up based on the output of the sensing mechanism 300', the crossbar 610 moves up with the solenoid 600 and no longer touches the secondary stationary contact 416, thereby opening the secondary contacts 612,614. It can be seen that the solenoid 600 is large in size such that the height of solenoid 600 extends over most of the height of the circuit breaker 1'. FIG. 4 illustrates an internal view of the hybrid circuit breaker 1, depicting the small size of the miniaturized electromechanical switch 531 as well as the power electronics circuit 531 as compared to the size of the solenoid 600 of the circuit breaker 1'. The breaker frame sizes of the circuit breaker 1' and the hybrid circuit breaker 1 are substantially the same.

Figure 5A:
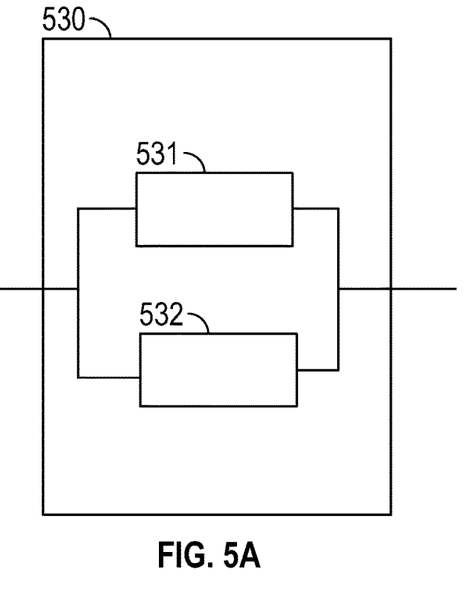
FIGS. 5A-B illustrate exemplary hybrid relay circuits in accordance with non-limiting embodiments of the disclosed concept.
Figure 5B:
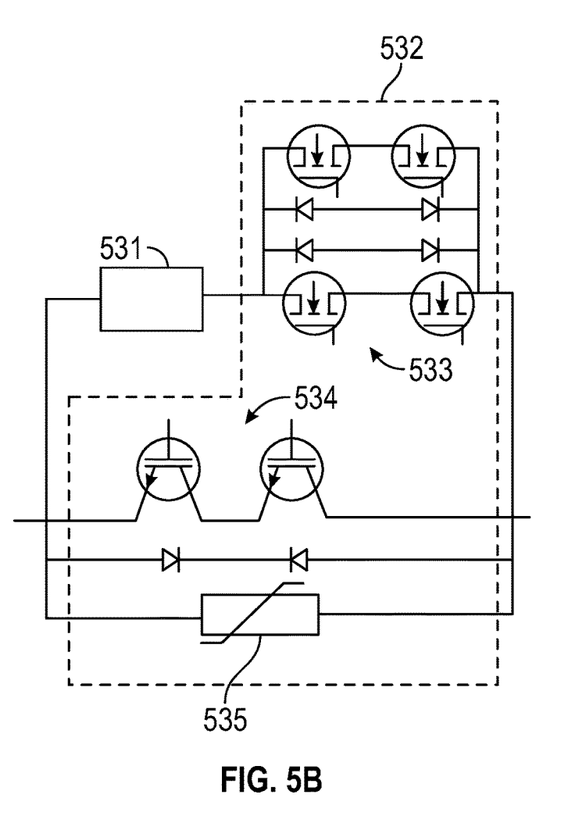

The miniaturized electromechanical relay 531 is also much faster than the traditional actuation mechanism. The ON/OFF switching time of a traditional relay is greater than 20 ms. The ON/OFF switching time of the miniaturized electromechanical relay 531 may be less than 10 μs. The power electronics circuit 532 also has shorter ON/OFF switching time. For example, a solid state relay may have the ON/OFF switching time around or greater than 1 ms. Further, the miniaturized electromechanical relay 531 has a longer lifespan than the traditional relay. For example, it can perform billions of switching operations over its life as compared to less than 30 million switching operations performed by the traditional relay over its lifetime. A solid state relay may also perform around or less than 100 million switching operation over its life. In addition, the miniaturized electromechanical relay 531 has near zero power consumption and ultra-low insertion loss. The miniaturized electromechanical relay 531 is disposed in parallel to the power electronics circuit 532 to balance and lower the on-state resistance since the on-state resistance of an electromechanical relay and electrical relay switches increases with higher current. FIGS. 5A and 6A-D illustrate a simple parallelism between the miniaturized electromechanical relay 531 and the power electronics circuit 532. FIG. 5B shows a different parallelism with various power electronics components such as MOSFETs 533, IGBTs 534, and an MOV 535.

The hybrid circuit breaker 1 is also "hybrid" since it performs hybrid of functions. In addition to the traditional circuit protection, the hybrid circuit breaker 1 also provides load control, energy management, and energy sharing. The hybrid circuit breaker 1 can connect to local or external networks remotely. It can act as a node or hub. It is capable of connecting via a router in a residence, hub or gateway. The hybrid circuit breaker 1 is remotely controllable by the user via the user device 5 communicatively coupled to the communication module 420 of the controller 400. The communication module 420 transmits and receives data between the hybrid circuit breaker 1, the user device 5, the cloud 3, and/or other external devices (e.g., without limitation, gateways, routers, controls, or nodes). The user can receive an alert or data measured by the sensing mechanism 300, the metrology component 350, and/or the voltage and current measurement circuit 360. Based on the alert or data received, the user may perform load control via the hybrid secondary switching device 500 remotely and in a wireless or wired connection. For example, the hybrid circuit breaker 1 may feed an entire area or be dedicated to a load. Depending on the circumstances, the user may turn OFF either the entire area or just the connected load. Further, the user can perform energy management at system level. For example, there are different rates for electricity during the day. The user may turn ON only the essential loads during the peak hours so as to prevent overloading of the control panels and possibly tripping a main braker connected to the entire facility. The user may also be alerted when the power use is reaching the tripping limit of the main breaker, and thus can unload some of the components that are energizing the facility so as to avoid black out of the entire facility. Further, the hybrid circuit breaker 1 can also provide bidirectional power flow capability. For example, the hybrid circuit breaker 1 can allow power to flow to the load as well as allow power to flow from the load, e.g., an electric vehicle, or to other loads connected in the power distribution system.

Figure 7:
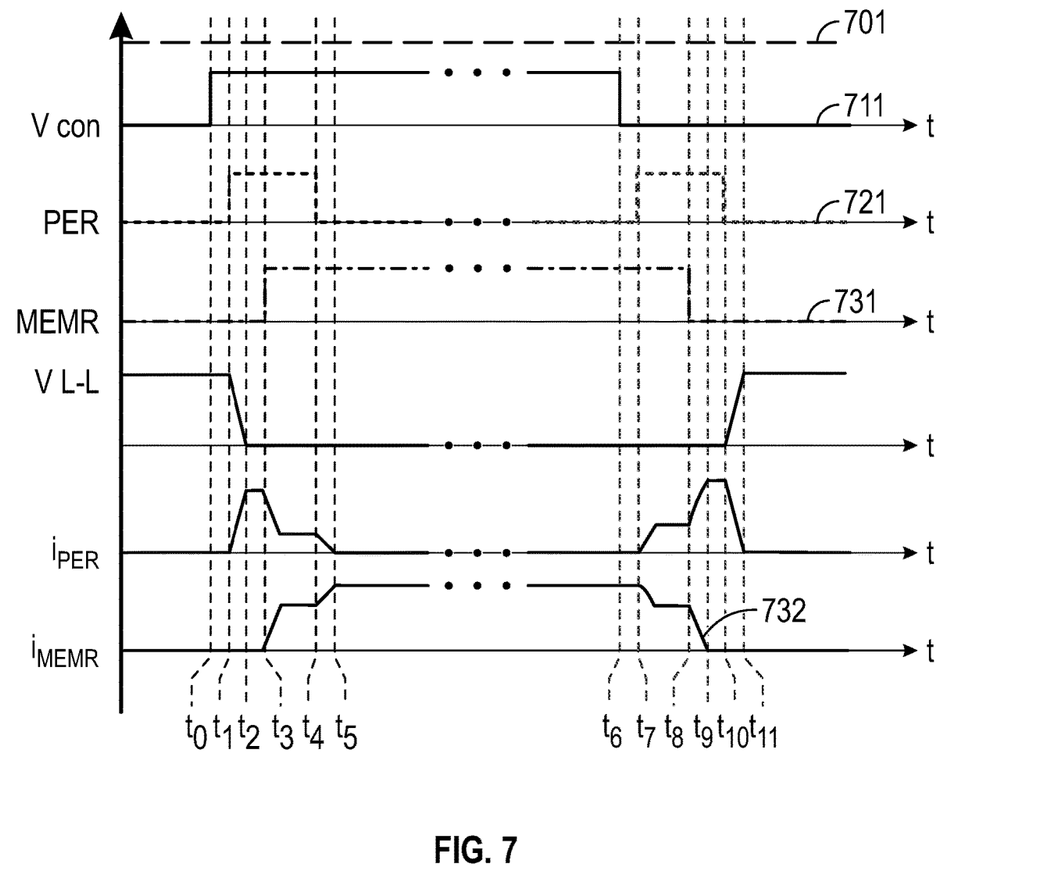
FIG. 7 illustrates a graph depicting signals associated with the normal operation of an exemplary hybrid secondary switching device of an exemplary hybrid circuit breaker in accordance with a non-limiting embodiment of the disclosed concept.

In operation, the protection module 410 causes the hybrid relay circuit driver 520 to open or close the secondary contacts 510 based at least in part on a user command and data (e.g., without limitation, voltage, current, power, energy measured) from the metrology component 350 and/or the voltage and current measurement circuit 360. FIG. 7 describes the operation of the hybrid relay circuit 530 when there is no short circuit event and/or the user may be performing load control or energy management via the user device 5. From time t0 to time t5, the turning ON operation of the hybrid relay circuit 530 is performed. From time t5 to time t6, normal operation of the hybrid relay circuit 530 is performed. From time t6 to time t1, the turning OFF operation of the hybrid relay circuit 530 is performed. Signal 711 indicates the operation of the primary trip/isolation relay component 110. Signal 712 illustrates the state of the constant Voltage ($V_{con}$). Signals 713 and 714 illustrate the states of the power electronics circuit 532 and the MEMR 531, respectively. Signals 715 and 716 illustrate the states of the current ($i_{PER}$) flowing through the power electronics circuit 532 and the current ($i_{MEMR}$) flowing through the MEMR 531, respectively. Signal 711 shows that the primary trip/isolation relay component 110 remains ON even after the completion of the turning OFF operation. As such, FIG. 7 illustrates the operation of the hybrid relay circuit 530 when no event of fault is detect. Signal 712 indicates that the constant voltage ($V_{con}$) 711 flows to the load from time t0 to time t6.

At time t1, the hybrid relay circuit driver 520 causes the power electronics circuit 532 to turn ON based on a signal from the protection module 410 of the controller 400. The power electronics circuit 532 remains ON until it is turned OFF at time t4. At time t3, the hybrid relay circuit driver 520 causes the MEMR 531 to turn ON. As shown by signals 715 and 716, $i_{PER}$ starts to flow at time t1, increases and reaches its highest at time t2, but starts to decrease at time t3 when the $i_{MEMR}$ starts to flow. Because the impedance of the MEMR 531 is very small, the $i_{MEMR}$ continues to increase and the $i_{PER}$ decreases. At time t5, the $i_{PER}$ decreases to zero, while the $i_{MEMR}$ reaches its highest at the same time. Due to the current drop caused by the low impedance of the MEMR 531, the power electronics circuit 532 is turned OFF at time t4. The current continues to flow through the MEMR 531 to the load and the MEMR 531 remains ON. The secondary contacts 510 are closed by the turning ON of the power electronics circuit 532 and kept closed by the MEMR 531 during normal operation, i.e., from time t5 to time t6.

Figure 6A:
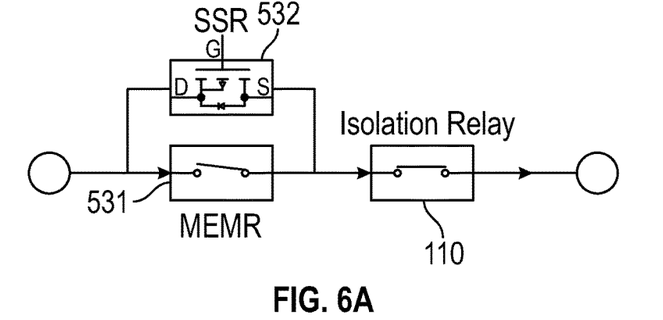
FIGS. 6A-D illustrate examples of operations of an exemplary hybrid secondary switching device of an exemplary hybrid circuit breaker under different operating conditions in accordance with non-limiting embodiment of the disclosed concept.

During normal operation, the protection module 410 sends a signal to the hybrid relay circuit driver 520 to keep the miniaturized electromechanical relay 531 ON and the power flows from the source to the load via the miniaturized electromechanical relay 531 as illustrated in FIGS. 6A and 7.

In the event of an overcurrent or fault that is not a short-circuit, the protection module 410 detects the event of fault based on the data received from the sensing mechanism 300, the metrology component 350, and/or the voltage and current measurement circuit 360. The protection module 410 then sends a signal to the communication module 420 of the detected fault. The communication module 420 in turn transmits an alert the user via the user device 5 about the detected fault. Upon receiving the alert, the user can transmit a user command to open the secondary contacts 510 to the communication module 420, which in turn transmits the command to the protection module 410. The protection module 410 then determines whether it is safe to open the secondary contacts 510, e.g., without limitation, if it has received a signal from the primary circuit protection device 100 that the primary trip/isolation relay component 110 is closed. Alternatively, the protection module 410 may determine to open the secondary contacts 510 if the primary circuit protection device 100 is non-responsive. Next, the protection module 410 sends a signal to the hybrid circuit relay driver 520 to perform the turning OFF operation.

Figure 6B:
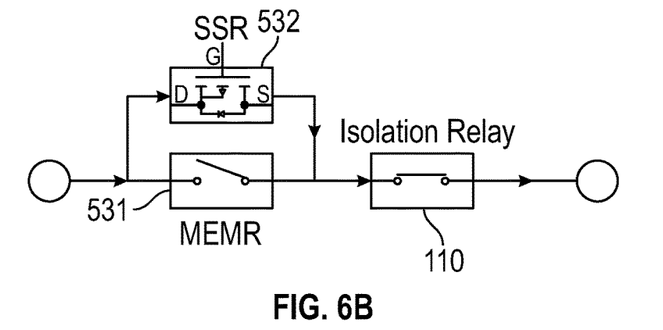
Figure 6C:
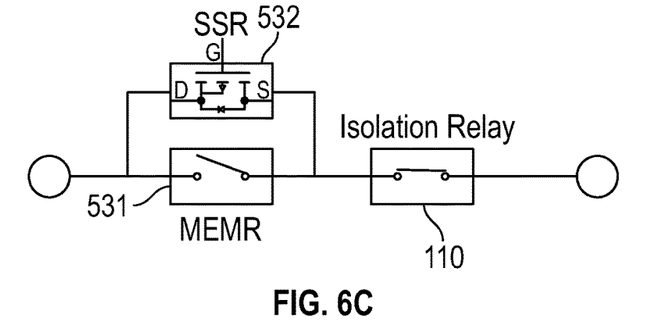

For the turning OFF operation, the hybrid relay circuit driver 530 causes the MEMS 531 to turn OFF based on a signal from the protection module 410. At time t6, the $V_{con}$ stops flowing and the hybrid relay circuit driver 530 causes the power electronics circuit 531 to turn ON at time t7 based on a signal from the protection module 410. The signal from the protection module 410 may be based on a user command to turn OFF the load attached to the hybrid circuit breaker 1. For example, the user may have decided to turn OFF the load while the user is away or on vacation, and thus, remotely turns OFF the load via the user device 5. The hybrid relay circuit driver 530, however, causes the power electronics circuit 532 to turn ON briefly to deviate current from flowing to the MEMR 531 for a very short time to protect the MEMR 531, which may not withstand increased energy associated with opening of the secondary contacts 510 due to, e.g., without limitation, its low impedance and small size. As such, the power electronics circuit 532 is turned OFF at time t7, upon which the $i_{MEMR}$ starts to decrease and the $i_{MEMR}$ starts to increase. At time t8, the MEMR 531 is turned OFF but the power electronics circuit 532 remains ON. As such, MEMR 531 initiates to clear the fault, and fault current is deviated to the power electronics circuit 532 from the MEMR 531 and channeled to to the load for a period commencing from time t8 and ending at time t10 as shown in FIG. 6B. The period is extremely brief (e.g., without limitation, microseconds (μs)) such that there is no time for the overload or short circuit to increase in its severity. Upon completion of the turning OFF of the MEMR 531, the power electronics circuit 532 is turned OFF at time t10 and the current stops flowing to the load as shown in FIG. 6C. In order to ensure that the turning OFF of the MEMR 531 is complete, the power electronics circuit 532 is turned OFF after the $i_{MEMR}$ becomes zero at time t9. The turning OFF of the power electronics circuit 532 causes the secondary contacts 510 to open at or about time t10.

Figure 6D:
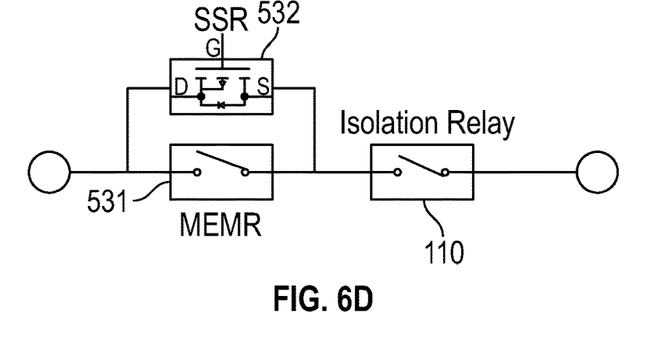

In the event of short circuit, the turning OFF operation is the same as above, except that the primary trip/isolation relay component 110 will be turned OFF after the power electronics circuit 532 is turned OFF in order to provide additional level of protection for the load, i.e., galvanic isolation, as shown by FIG. 6D. As such, signal 711 will drop to zero at or after time t11. This additional protection ensures that the short circuit is fully cleared and galvanic isolation between the power source and the load is provided.

By allowing the deviation of overload or overcurrent during an event of fault, the hybrid circuit breaker 1 overcomes the problems associated with the miniaturized electromechanical relay 531. For example, a MEMR switch may not withstand high voltage and current overlap during switching transition. Charging and discharging of the MEMR switch can lead to arcing problems that can be more severe with high voltage and current. The MEMR switch may incur short-time temperature rise to melt or evaporate the secondary contacts, and even if the instant over-heating does not occur, this energy will damage the MEMR device eventually. As such, until very recently a MEMR or a rotary switch could not be directly used as a high rating power relay. The hybrid circuit breaker 1 resolves these problems by combining the power electronics circuit 532 with the miniaturized electromechanical relay 531 in parallel to the power electronics circuit 532. That is, the high voltage and current occurring from a fault event can now be deviated from the miniaturized electromechanical relay 531 to the power electronics component 532, thereby preempting the failure of the miniaturized electromechanical switch 531 during the short circuit event. Such preemption not only prolongs the life of the hybrid circuit breaker 1, but also protects the load by ensuring the fault is cleared in part by deviating the fault current to the power electronics circuit 532.

Figure 8:
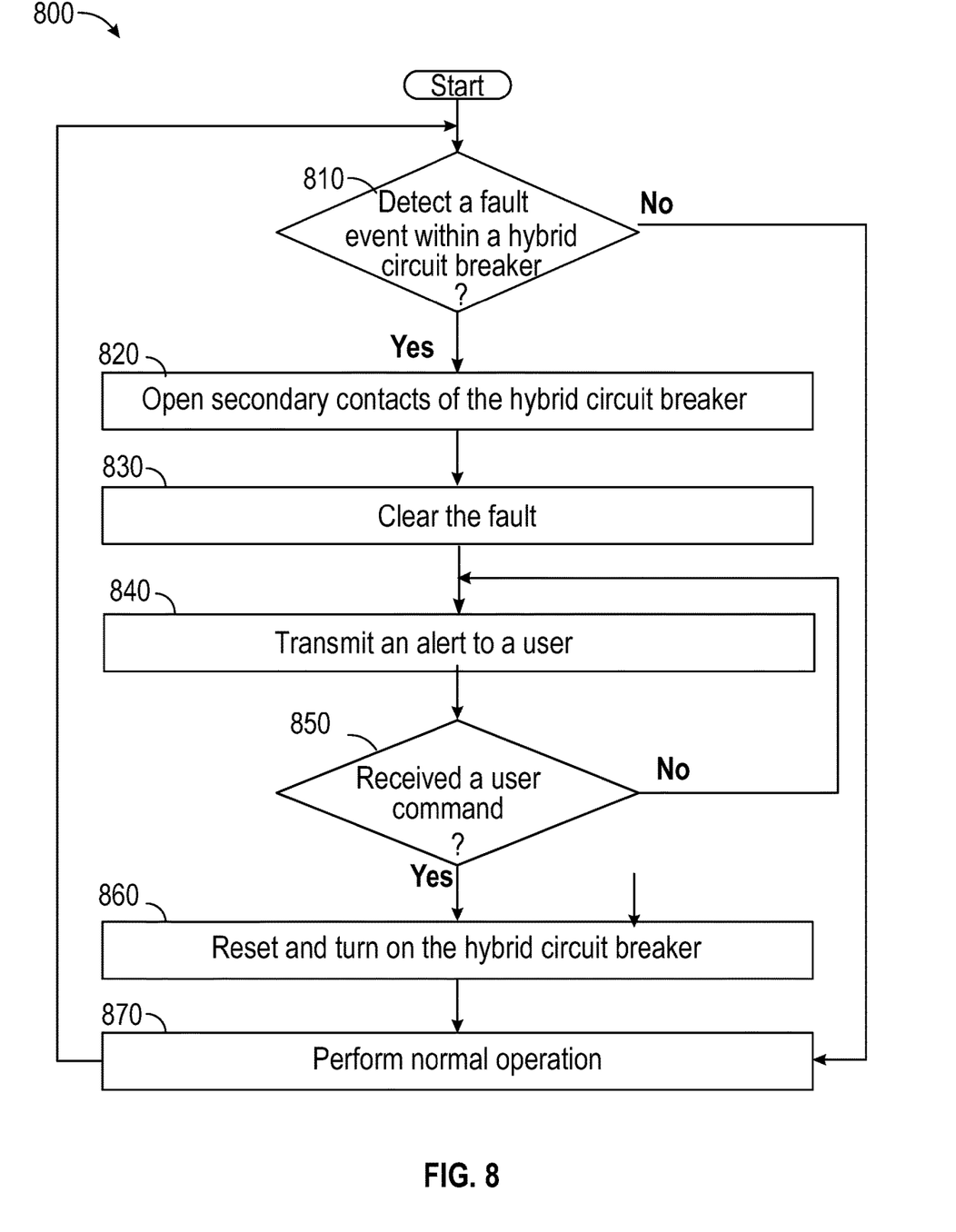
FIG. 8 is a flow chart of a method for energy monitoring using an exemplary hybrid circuit breaker in accordance with a non-limiting embodiment of the disclosed concept.

FIG. 8 is a flow chart of a method 800 for remotely switching secondary contacts of a hybrid circuit breaker using a hybrid relay circuit according to an example, non-limiting example of the disclosed concept. The method 800 can be performed by the hybrid circuit breaker 1 and components thereof as illustrated in FIGS. 1-6D.

At 810, the controller of the hybrid circuit breaker determines whether a fault event is detected. If no, the method 800 proceeds to 870. If yes, the method 800 proceeds to 820.

At 820, a hybrid relay circuit driver opens secondary contacts of the hybrid circuit breaker. To open the secondary contacts, the hybrid rely circuit breaker causes a power electronics circuit to be turned ON based on a signal from the protection module of the controller. Then, the hybrid relay circuit driver causes a miniaturized electromechanical relay to be turned OFF. The hybrid relay circuit driver then turns OFF the power electronics circuit upon the completion of the turning OFF of the miniaturized electromechanical relay. As such, the fault current is deviated from the miniaturized electromechanical relay to the power electronics. For a brief period, the fault current is passed to the load via the power electronics circuit. However, this does not damage the load because the period is very brief such that there is no time for the short circuit to expand or grow in its severity. Upon the completion of the turning OFF of the miniaturized electromechanical relay, the hybrid relay circuit driver turns OFF the power electronics circuit. The secondary contacts are open upon turning OFF the power electronics circuit. In some examples, the primary trip/isolation relay component of the hybrid circuit breaker is turned OFF to provide galvanic isolation between the power source and the load.

At 830, the hybrid circuit breaker clears the fault.

At 840, the controller transmit an alert to a user. The alert may include the type of the fault and identity of the load disconnected.

At 850, the controller determines if it has received a user command. The user command may include a command to reset and turn ON the hybrid circuit breaker. If no, the method 800 returns to 840. In some examples, the controller may reset the circuit breaker and restore power without user input. For example, if the controller determines that the fault is temporary, the controller can clear the fault by opening the secondary contacts and upon clearing the fault, the controller can restore power without user input. In another example, if the controller determines that the primary circuit protection device is nonresponsive or circuit protection is required, the controller may open the secondary contacts without user input. Upon opening the secondary contacts, the controller may open the primary trip/isolation relay component as an additional level of protection to ensure that no fault current flows to the load side. If yes, the method 800 proceeds to 880.

At 860, the hybrid circuit breaker is reset and turned back on. The user may manually or remotely reset and turn back on the hybrid circuit breaker upon clearing of the fault.

At 870, the hybrid circuit breaker performs normal operation and as a part of the normal operation, the controller performs step 810.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A hybrid circuit breaker structured to be coupled to a power source and a load, comprising:
    a primary trip/isolation relay component and a primary trip/isolation relay component driver structured to cause the primary trip/isolation relay component to open and interrupt current from flowing to the load in an event of fault;
    a sensing mechanism structured to sense at least current, voltage, and power flowing to the load;
    a metrology component coupled to the sensing mechanism and structured to monitor and measure at least the current, voltage and power;
    a controller coupled to the primary trip/isolation relay component driver, the sensing mechanism, and the metrology component, and structured to detect the event of fault based on data received from the sensing mechanism and the metrology component and communicate with a user device about at least the detected event of fault or the data; and
    a hybrid secondary switching device coupled to the controller and the primary trip/isolation relay component, the hybrid secondary switching device including secondary contacts, a hybrid relay circuit driver, and a hybrid relay circuit including a miniaturized electromechanical relay and a power electronics circuit connected in parallel with the miniaturized electromechanical relay,
    wherein the miniaturized electromechanical relay is a micro-electromechanical device,
    wherein the controller is configured to cause the hybrid relay circuit driver to open or close the secondary contacts using the miniaturized electromechanical relay and the power electronics circuit based on at least one of the data and a user command, and
    wherein the hybrid relay circuit driver is configured such that during normal operation, the hybrid relay circuit driver causes the miniaturized electromechanical relay to be turned ON and allows the power to flow to the load via the miniaturized electromechanical relay.

2. The hybrid circuit breaker of claim 1, wherein the hybrid relay circuit driver is configured to cause the power electronics circuit to be turned OFF.

3. The hybrid circuit breaker of claim 1, wherein the hybrid relay circuit driver is configured such that upon detection of the event of fault, the hybrid relay circuit driver causes the power electronics circuit to be turned ON and the miniaturized electromechanical relay to be turned OFF, and wherein fault current is deviated from the miniaturized electromechanical relay to the power electronics circuit.

4. The hybrid circuit breaker of claim 3, wherein the hybrid relay circuit driver is configured such that upon completion of the turning OFF of the miniaturized electromechanical relay, the hybrid relay circuit driver causes the power electronics circuit to be turned OFF.

5. The hybrid circuit breaker of claim 4, wherein the controller is configured to cause the primary trip/isolation relay component to be turned OFF after the power electronics circuit is turned OFF.

6. The hybrid circuit breaker of claim 5, wherein the primary trip/isolation relay component provides galvanic isolation between the power source and the load.

7. The hybrid circuit breaker of claim 1, wherein the miniaturized electromechanical relay comprises a rotary relay, an ultrafast electromechanical relay, or vacuum, air, or high dielectric gas filled relay.

8. The hybrid circuit breaker of claim 1, wherein the power electronics comprises a solid state device including the at least insulated-gate bipolar transistors (IGBTs), metal-oxide-semiconductor field-effect transistors (MOSFETs), or metal oxide varistors (MOVs).

9. The hybrid circuit breaker of claim 1, wherein the hybrid circuit breaker is communicatively coupled to the user device or cloud via wireless or wired communications technology including WiFi, Bluetooth Low Energy, or other appropriate communications technologies.

10. A method of energy monitoring in a power distribution system, comprising:
providing a hybrid circuit breaker that comprises (i) a primary trip/isolation relay component and a primary trip/isolation relay component driver structured to cause the primary trip/isolation relay component to open and interrupt current from flowing to the load in an event of fault, (ii) a sensing mechanism structured to sense at least current, voltage, and power flowing to the load, (iii) a metrology component coupled to the sensing mechanism and structured to monitor and measure at least the current, voltage and power, (iv) a controller coupled to the primary trip/isolation relay component driver, the sensing mechanism, and the metrology component, and structured to detect the event of fault based on data received from the sensing mechanism and the metrology component and communicate with a user device about at least the detected event of fault or the data; and (v) a hybrid secondary switching device coupled to the controller and the primary trip/isolation relay component, the hybrid secondary switching device including secondary contacts, a hybrid relay circuit driver, and a hybrid relay circuit including a miniaturized electromechanical relay and a power electronics circuit connected in parallel with the miniaturized electromechanical relay;
performing circuit protection;
providing load control; and
providing energy management,
wherein the miniaturized electromechanical relay is a micro-electromechanical device,
wherein the performing the circuit protection comprises:
determining whether the event of fault is detected within the hybrid circuit breaker; and
in response to a determination that the event of fault is not detected, performing normal operation by the hybrid circuit breaker, and
wherein the performing normal operation comprises:
causing, by the hybrid relay circuit driver, the miniaturized electromechanical relay to be turned ON and allowing the power to flow to the load via the miniaturized electromechanical relay.

11. The method of claim 10, wherein the performing the circuit protection further comprises:
in response to a determination that the event of fault is detected, opening secondary contacts of the hybrid circuit breaker based at least in part on a user command.

12. The method of claim 10, wherein the performing normal operation further comprises:
causing, by the hybrid relay circuit driver, the power electronics circuit to be turned OFF.

13. The method of claim 11, wherein the opening the secondary contacts comprises:
causing, by the hybrid relay circuit driver, the power electronics circuit to be turned ON;
causing, by the hybrid relay circuit driver, the miniaturized electromechanical relay to be turned OFF;
deviating fault current from the miniaturized electromechanical relay to the power electronics circuit; and
turning OFF the power electronics circuit upon completion of the turning OFF of the miniaturized electromechanical relay.

14. The method of claim 13, wherein the opening the secondary contacts further comprises:
turning OFF the primary trip/isolation relay component after the power electronics circuit is turned OFF.

15. The method of claim 14, wherein the primary trip/isolation relay component provides galvanic isolation between the load and a power source coupled to the hybrid circuit breaker.

16. The method of claim 10, wherein the providing the load control comprises:
transmitting, by the controller, at least the data received from the sensing mechanism and the metrology component to the user device;
determining, by a user, if a load or an entire area within the power distribution system is to be turned OFF based on the data;
receiving, by the controller, a user command; and
turning OFF selected load or area based on the user command.

17. The method of claim 10, wherein the providing the energy management comprises:
transmitting, by the controller, at least power rate information and the data received from the sensing mechanism and the metrology component to the user device;
determining, by a user, if at least a load within the power distribution system is to be turned OFF based at least in part on the power rate information and the data;
receiving, by the controller, a user command stating that at least one of a selected load to be turned OFF; and
turning OFF the selected load based on the user command.

18. A method of energy monitoring using a hybrid circuit breaker including secondary contacts and a miniaturized electromechanical relay in parallel to a power electronics circuit, both the miniaturized electromechanical relay and the power electronics circuit being coupled to the secondary contacts, current flowing to a load via the miniaturized electromechanical relay during normal operation, comprising:
detecting an event of fault within the hybrid circuit breaker;
turning ON the power electronics circuit;
turning OFF the miniaturized electromechanical relay;
deviating fault current from the miniaturized electromechanical relay to the power electronics circuit; and
turning OFF the power electronics upon completion of the turning OFF of the miniaturized electromechanical relay,
wherein the miniaturized electromechanical relay is a micro-electromechanical device.

* * * * *